US012795233B2

(12) United States Patent
Barish et al.

(10) Patent No.: US 12,795,233 B2
(45) Date of Patent: Nov. 10, 2026

(54) TOOL AND METHOD FOR DETECTING AND COMPENSATING FOR CAMERA LENS FOCUS ERROR AND DRIFT

(71) Applicant: ZEBRA TECHNOLOGIES CORPORATION, Lincolnshire, IL (US)

(72) Inventors: Justin F. Barish, Kings Park, NY (US); Matthew Lawrence Horner, Sound Beach, NY (US); Adithya H. Krishnamurthy, Plainview, NY (US); Brian S Robertson, Harrisburg, PA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 209 days.

(21) Appl. No.: 18/604,443

(22) Filed: Mar. 13, 2024

(65) Prior Publication Data

US 2025/0294252 A1 Sep. 18, 2025

(51) Int. Cl.

*H04N 23/67* (2023.01)
*H04N 23/55* (2023.01)
*H04N 23/81* (2023.01)

(52) U.S. Cl.

CPC ........... *H04N 23/675* (2023.01); *H04N 23/55* (2023.01); *H04N 23/81* (2023.01)

(58) Field of Classification Search

CPC ...... H04N 23/675; H04N 23/55; H04N 23/81; H04N 23/673

See application file for complete search history.

(56) References Cited

U.S. PATENT DOCUMENTS

| | | | | |
|---|---|---|---|---|
| 10,373,336 | B1 * | 8/2019 | Islam | G06T 5/80 |
| 11,108,946 | B1 * | 8/2021 | Gurevich | G06K 7/10811 |
| 11,265,455 | B1 * | 3/2022 | Kuchenbrod | G06T 7/74 |
| 2006/0044452 | A1 * | 3/2006 | Hagino | G02B 27/40 348/E5.045 |
| 2010/0172573 | A1 * | 7/2010 | Bailey | G06T 7/90 382/164 |
| 2021/0294071 | A1 * | 9/2021 | Vinogradov | G02B 7/023 |
| 2023/0007185 | A1 * | 1/2023 | Kuchenbrod | G06K 7/10722 |

* cited by examiner

*Primary Examiner* — Abdelaaziz Tissire

(57) ABSTRACT

A system and methods for performing focus tuning of an imaging system. The method includes an image sensor obtaining a plurality of images. The processor identifies a reference element in one or more of the images, and further filters the images according to an image metric to generate a filtered set of reference images. The processor then determines a focus value for each image of the filtered set of reference mages, and further determines a focus drift from the focus values. Data indicative of the focus drift or focus values is then stored in a memory, and may be used further to determine a focus compensation value to adjust an optical element to tune the focus of the imaging system.

19 Claims, 7 Drawing Sheets

TOOL AND METHOD FOR DETECTING AND COMPENSATING FOR CAMERA LENS FOCUS ERROR AND DRIFT

BACKGROUND

Over the years, industrial automation has come to rely heavily on machine vision components capable of assisting operators in a wide variety of tasks. In some implementations, machine vision components, like cameras, are utilized to track objects passing objects, like those which move on conveyor belts past stationary cameras. Often these cameras, along with the backend software, are used to capture a variety of parameters associated with the passing items. To do this, the software is configured with a job which includes a series of tools that are executing during each job execution. Subsequently, as items (e.g., boxes) pass within the field of view (FOV) of the camera, a job is executed for each such item.

Typical machine vision systems and barcode readers, such as handheld barcode readers, point of sale scanners, and direct part marking scanners, require high quality, low-blur images to perform desired machine vision operations and to decode barcodes found in images. Therefore, the focus calibration of scanners and machine vision systems is integral for proper and efficient operation. With industrial fixed scanning and machine vision cameras, a critical aspect for customers is that the cameras begin and stay in focus in order to perform the precise measurements and decoding expected. However, after setting an initial focus, over time, the focus of the system can drift due to temperature, aging, and other factors causing errors in the data presented to a user or customer. Additionally, due to variations between lenses, lens settings between cameras can be different, making the ability to use the same configuration across cameras not viable.

Typically, focus tuning or alignment is performed manually using either a graphical user interface (GUI) or by hand using optical tuning tools to adjust optical mounts. The focus tuning process can be very slow and cumbersome as it requires a user to look at captured images and determine, in real time, an ideal focus from the captured images. The user must both be observing images and physically adjusting the focus at the same time which is often inconvenient for many barcode reader systems. Further, manual focus tuning is error prone as it relies on the subjective nature of a person to determine when they believe an image is the sharpest.

As such, it could be beneficial for a machine vision system to implement a method for performing focus tuning that does not require manual tuning and subjective evaluation of a person or operator.

SUMMARY

In an embodiment, the present invention is a method for performing focus tuning of an imaging system. The method includes obtaining, by an imaging sensor within the imaging system, a plurality of images of a field of view of the imaging sensor; identifying, by a processor within the imaging system, a reference element in at least two of the images of the plurality of images thereby establishing a set of reference images; filtering, by the processor within the imaging system, the set of reference images based on an image metric and establishing a filtered set of reference images; identifying, by the processor and from the set of filtered reference images, a plurality of focus values of the imaging system, each focus value corresponding to a respective reference image of the filtered set of reference images; determining, by the processor, a focus trend from the plurality of focus values; and storing, in a memory, data indicative of the focus trend.

In a variation of the current embodiment, the method further includes determining a focus compensation value from the plurality of focus values or the focus trend, and optionally may further include tuning, by a controller configured to control the focal length of a tunable optical element of the imaging sensor, the focal length of the tunable optical element according to the focus compensation value.

In continued variants of the current embodiment, the tunable optical element may include a liquid lens, or an electrically tunable optical element, or electrically tunable lens.

In another variation of the current embodiment, identifying a reference element in at least two of the images of the plurality of images includes providing, via a user interface, one or more images of the plurality of images to a user; receiving, via the user interface, a selection of a region of interest in one or more images of the plurality of images; and identifying, by the processor, the reference element in the region of interest.

In yet more variants of the current embodiment, the method filtering the set of reference images based on an image metric includes determining, by the processor, an image metric value for each image of the set of reference images; and determining, by the processor, the filtered set of reference images as images of the set of reference images with a respective image metric value within an image metric threshold.

In even more variants of the current embodiment, the method further includes receiving, via a user interface, from a user an input indicative of a condition for performing focus tuning; and initiating identifying, by the processor, the reference element in at least two of the images of the plurality of images based on the received condition. Further, in the current variant, the condition may include at least one of a temporal frequency of performing focus tuning, a number of scanning operations, a lens temperature fluctuation, environmental temperature fluctuation, or aging of a lens.

In another embodiment, the present invention is a focus tuning imaging system including a tunable optical element; a controller in communication with the tunable optical element, the controller configured to control a focus of the tunable optical element; an imaging sensor configured to capture images of a field of view of the imaging sensor; and a processor and computer-readable media storage having machine readable instructions stored thereon that, when the machine readable instructions are executed, cause the imaging system to: (i) obtain, by the imaging sensor, a plurality of images of a field of view of the imaging sensor; (ii) identify, by the processor, a reference element in at least two of the images of the plurality of images thereby establishing a set of reference images; (iii) filter, by the processor, the set of reference images based on an image metric and establishing a filtered set of reference images; (iv) identify, by the processor and from the set of filtered reference images, a plurality of focus values of the imaging system, each focus value corresponding to a respective reference image of the filtered set of reference images; (v) determine, by the processor, a focus trend from the plurality of focus values; and (vi) store, in a memory, data indicative of the focus trend.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
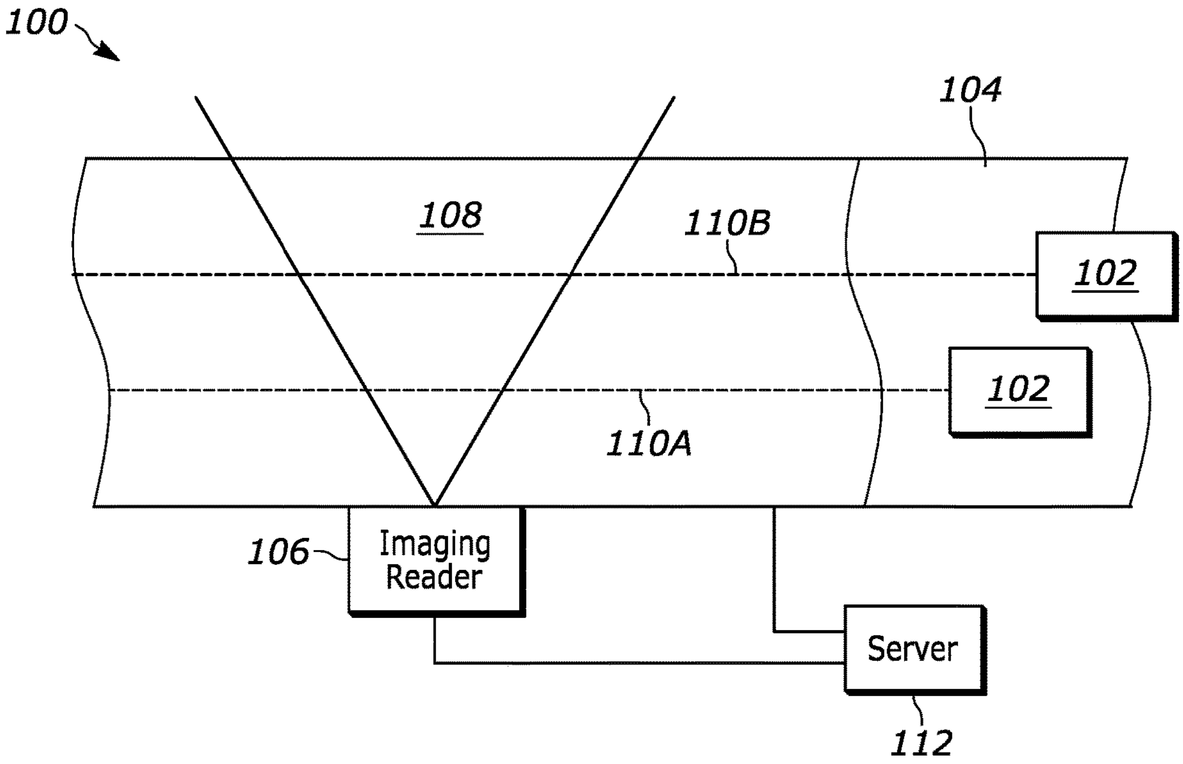
FIG. 1 is an example system for performing focus tuning of a fixed industrial scanner system, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Electrically controlled variable focus (VF) lenses are convenient, low-power solutions for fast auto-focus (AF) on objects of interests (OOI) in machine vision and bar-code applications. However, when location of objects of interest in the field of view varies (e.g., parts moving on conveyor, a person moving an object across a scanner field of view, etc.) or focus drift occurs, an AF imaging system may be unable to determine the OOI. In many scanning applications, it is desirable to one or more keep focus planes constant. VF lenses do not provide any feedback signal indicating a current optical power or focus which can change after initial settings due to ambient temperature variation, aging, and other factors. Further, manual focus control is typically how imaging systems are setup and calibrated. Manual setup can lead to errors due to subjective image analysis of a person performing the calibration, and is also limited to a single plan of inspection at a time. Manual setup is also time consuming and requires training and expertise that may not be readily available. The disclosed system and methods overcome many of the described obstacles by enabling automatic tuning of focus of an imaging system utilizing a VF optical element.

The disclosed system and methods enable the focus tuning of variable focus and autofocus systems for performing scanning in machine vision and barcode applications. The method obtains a plurality of images, identifies a reference element or reference features in one or more of the obtained images, filters out images based on an image metric to establish a set of reference images, identifies focus values from the set of reference images, determines a focus trend or focus shift based on the focus values, are stores data indicative of the focus trend into a memory. The disclosed system and methods may be performed during setup of a system for an initial calibration, during barcode scanning, during machine vision operations, or during operation to retune a focus of a system or to change the reference focuses depending on a change of a target, change of distances of targets from the imaging system, or focus drift of one or more optical elements of the system.

Referring now to the drawings, FIG. 1 illustrates an exemplary environment where embodiments of the present invention may be implemented, including the processes described and illustrated herein. In the present example, the environment is provided in the form of a scanning station 100 where goods 102 are moved across or along a scanning surface 104 and are scanned by an imaging reader 106 to identify the goods 102. In some embodiments, the scanning station is a point-of-sale (POS) station, which may have a computer system and an interface, not shown, for optically scanning goods and identifying the goods and characteristics of the goods for affecting a transaction. In some embodiments, the scanning station 100 is part of an inventory delivery system, where goods are conveyed by the scanning surface or across the scanning surface to monitor and control delivery of the goods, for example, shipping goods from a facility or receiving shipped goods to a facility. While the describe system and method may be implemented in a point-of-sale (POS) station, the described technologies would also be beneficial for machine vision applications that scan objects on a conveyer belt at a factory or distribution center, for example.

The scanning surface 104 may be a stationary surface, such that the goods 102 are manually moved relative to the surface 104. In embodiments, the scanning surface 104 may move the goods 102 or be moved by another automated means. In other embodiments, the scanning surface 104 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 102 may be moved continuously relative to the imaging reader 106, such that the goods 102 are constantly moving through a working (or scanning) range 108 of the station 100. In some examples, the goods 102 move in a discretized manner, where, at least part of the time the goods 102 are maintained fixed on the surface 104 relative to the imaging reader 106 for a period of time, sufficient to allow one or more images to be captured of the goods 102.

The goods 102 may move along different substantially linear paths 110A, 110B, etc. each path traversing the working range 108 but at a different distance from the imaging reader 106. Indeed, the paths 110A, 110B are for illustration purposes, as the goods 102 may traverse across the surface 104 along a single path, or along a plurality of paths at any distance from the imaging reader 106. Optics of the imaging reader 106 must be aligned and properly tuned for the imaging reader 106 to image the goods 102 at distances according to the linear paths 110A and 110B. Typically, imaging readers are manually tuned or aligned which requires a person to either utilize a GUI to control tunable elements, or to manually tune lenses and optics physically by hand using a screwdriver or other tool. The manual tuning of the imaging system 106 is prone to subjective error as optimal focus of the imaging reader 106 is subjectively determined by a person observing obtained images at different focuses. Further, manual tuning the imaging reader 106 is time consuming for a single focus of the imaging reader 106, which compounds for systems requiring a plurality of reference focuses as in the example of FIG. 1 having goods along two paths 110A and 110B. Over time, the focus of optical elements may drift causing one or more of the goods 102 to be out of focus which results in inefficient barcode scanning, or renders the scanning station 100 unable to perform machine vision operations as required.

In some exemplary embodiments, the imaging reader 106 includes a variable focus (VF) imaging system, or an autofocus system in which the reader 106 controls the VF imaging system to set the focus of the imaging system to predetermined reference focuses for scanning an object of interest (OOI) such as the goods 102. The autofocus system may cause the reader 106 to control the VF imaging system to perform a focus tuning operation to determine a focus drift, and to further control the VF imaging system to tune the focus of the system to correct for focus drift. A user may initiate the focus operation during setup of the scanning station or of the imaging reader 106. A user may set, via a user interface, the autofocus system to initiate focus tuning after a certain number of scans, after a certain number of executions of machine vision operations, after a number of object inspections, after a number of images have been taken, or periodically based on time such as every hour etc.

While, in FIG. 1, the imaging reader 106 is depicted as being to the side of the goods 102, in embodiments, the imaging reader 106 may be positioned directly above the goods 102, above the goods 102 in front of or behind the goods 102 configured to image the OOI, or at another position for imaging a region of interest of the goods 102 or any OOI. The imaging reader 106 captures images of goods 102 and may perform machine vision processes at a single plane, or across multiple planes within a range of depths around a focal plane. In such implementations, the goods or objects will appear more in focus at some imaging planes in comparison to others. By capturing images of the goods at only certain imaging planes, i.e. reference planes, or within a range of planes of a focal plane, the imaging reader 106 is able to identify the goods 102 and perform machine vision processes. The imaging reader 106 can be configured such that if it its focal plane is held constant r locked, and images are captured at specific imaging planes irrespective of which scan path the good traverses and without needing to continuously detect the good and autofocus onto the good. This operation greatly reduces power consumption demands on the imaging reader 106. A user may then provide instructions to a controller to initiate a refocus operation, or to control how often or when to perform a refocusing or autofocusing operation.

The imaging reader 106 requires initial setup before operation, and further, as previously described, electrically tunable AF lenses and systems may undergo focus plane drift due to environmental and other factors, which causes the defocusing of images of OOI reducing the efficacy of the VF imaging reader 106. As discussed further herein, the identification and scanning efficiencies can be increased by performing tuning of the imaging reader 106 using an AF lens or system to determine a focus drift and to compensate focus of the imaging reader 106. The described methods may be performed an initial setup of the imaging reader 106, or at any time when tuning or refocusing of the imaging reader may be required for performing machine vision and scanning applications (e.g., after a certain number of scans or captured images, after a certain amount of time, periodically, etc.). The disclosed systems and methods increase efficiency, and therefore reduced time required, for reading identifiers on an OOI, e.g., to identify an indicia or other barcode on the good. The methods use image quality metrics to determine a set of reference images and, therefrom reference focuses. The reference focuses may then be used to determine a focus drift or trend and a controller may control a variable focus optical element to compensate or correct for the focus drift. At least some of the image quality metrics and parameters, scanning parameters, and/or calibration parameters described further herein, may be stored on a server 112 communicatively coupled to the imaging reader 106, and the imaging reader may retrieve the image quality metrics and parameters, scanning parameters, and/or calibration parameters, from the server or another memory or form of storage.

Figure 2:
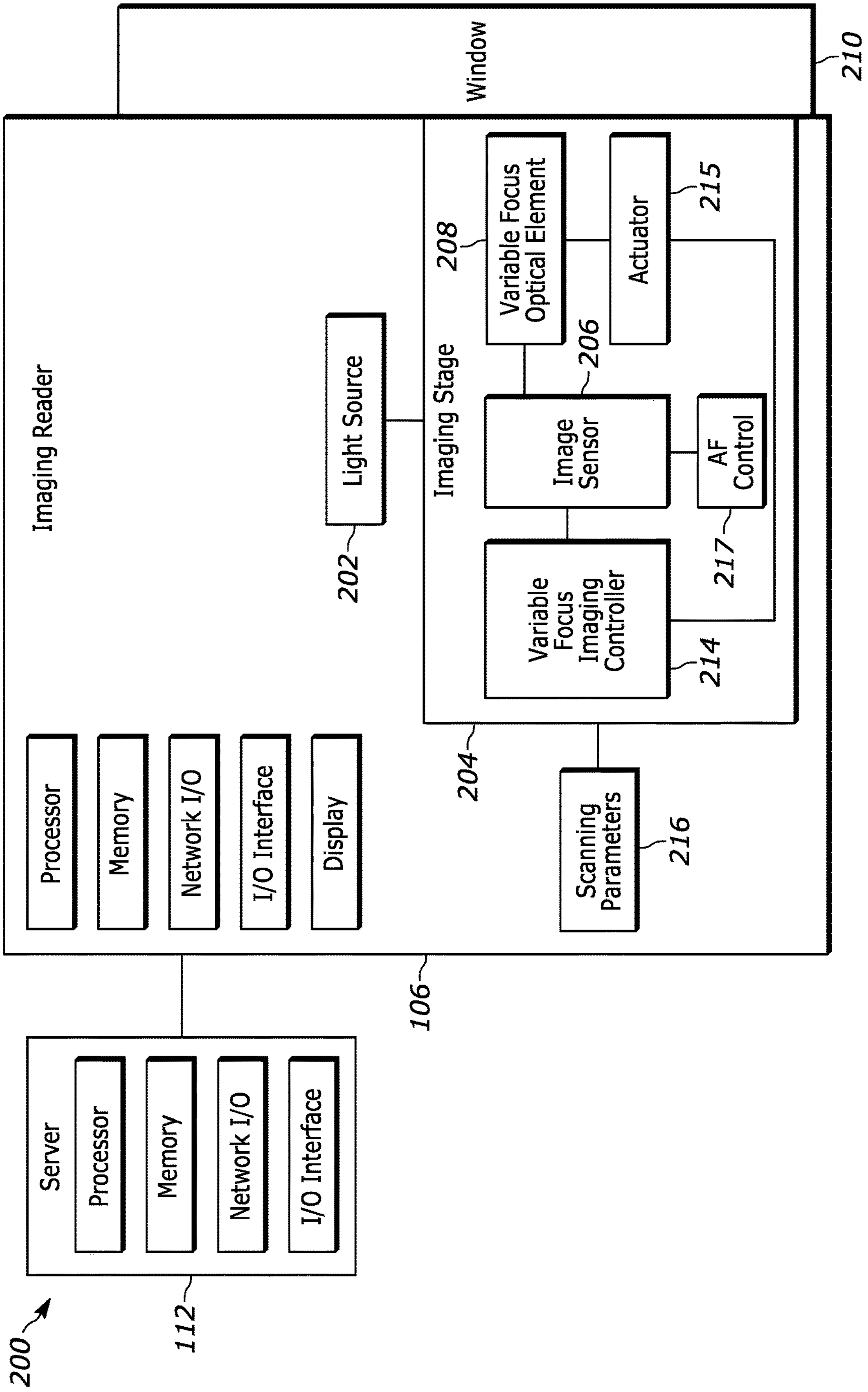
FIG. 2 illustrates a block connection diagram of system including an imaging reader, in accordance with embodiments described herein.

FIG. 2 illustrates a block connection diagram of system 200 including an imaging reader 106. In FIG. 2 the imaging reader 106 may have one or more processors and one or more memories storing computer executable instructions to perform operations associated with the systems and methods as described herein. The imaging reader 106 includes a network input/output (I/O) interface for connecting the reader to the server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 112 (and/or other connected devices) may be located in the same scanning station 100. In other embodiments, server 112 (and/or other connected devices) may be located at a remote location, such as on a cloud-platform or other remote location. In still other embodiments, server 112 (and/or other connected devices) may be formed of a combination of local and cloud-based computers.

Server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle Weblogic Server platform, the JBoss platform, or the IBM WebSphere platform, etc. Other technologies or platforms, such as Ruby on Rails, Microsoft.NET, or similar may also be used.

In the illustrated example, the imaging reader 106 includes a light source 202, which may be a visible light source (e.g., a LED emitting at 640 nm) or an infrared light source (e.g., emitting at or about 700 nm, 850 nm, or 940 nm, for example), capable of generating an illumination beam that illuminates the working range 108 for imaging over an entire working distance of that working range 108. That is, the light source 202 is configured to illuminate over at least the entire working range 108. The illumination intensity of the light source 202 and the sensitivity of an imaging reader can determine the further and closest distances (defining the distance of the working range, also termed the scanning range) over which a good can be scanned, and a barcode on the good can be decoded. The light source 202 is controlled by processor and may be a continuous light source, an intermittent light source, or a signal-controlled light source, such as a light source trigged by an object detection system coupled (or formed as part of though not shown) to the imaging reader 106. The light source may be an omnidirectional light source.

The imaging reader 106 further includes an imaging arrangement 204 having an imaging sensor 206 positioned to capture images of an illuminated target, such as the goods 102 or another OOI, within the working range 108. In some embodiments, the imaging sensor 206 is formed of one or more CMOS imaging arrays. A variable focusing optical element 208 is positioned between the imaging sensor 206 and a window 210 of the imaging reader 106. A variable focus imaging controller 214 is coupled to the variable focusing optical element 208 and controls the element 208 to define one or more discrete imaging planes for the imaging sensor. The one or more discrete imaging planes may be considered one or more focal planes as described here. The focal plane of the imaging sensor is the imaging plane that is expected to result in the highest efficiency of decoding of indicia and performing machine vision processes, which may depend on an edge sharpness value or another property of an image.

In the illustrated example, the controller 214 is coupled to the variable focusing optical element 208 through an actuator control unit 215 and bypasses an optional autofocus control unit 217. The actuator 215 may include a focusing lens drive, a shift lens drive, a zoom lens drive, an aperture drive, angular velocity drive, voice coil motor drive, and/or other drive units for controlling operation of the optical element 208, which itself may comprise multiple lens, lens stages, etc. While described herein in reference to a variable optical element, the methods for performing focus tuning may be performed with systems that employ a fixed focus lens. In such implementations, a system may provide an indication of focus drift to a user, and the user may manually adjust, or replace, the fixed focus lens to perform focus tuning of the imaging reader.

The VF optical element 208 may be a deformable lens element, a liquid lens, a T-lens or another VF optical element. In some embodiments, the optical element includes a voice coil actuator motor in the actuator 215 that is controllably adjusted by the controller 214. In exemplary embodiments, such as some barcode scanning applications, the VF optical element 208 has an aperture from 1 mm to 5 mm. In some embodiments, the image stage 204 is implemented as part of a VF camera assembly.

In exemplary embodiments, the variable focus imaging controller 214 has hands-free mode in which the variable focus optical element 208 and the imaging sensor 206 are controlled to capture an image of a target at a focus imaging plane within the working range in an ordered manner to form a set of captured images of the target, stored in the memory. In implementations, the variable focus optical element 208 and the imaging sensor 206 are controlled to capture a plurality of images of different targets at a single focus imaging plane, and focus values of the system are determined from at one or more of the plurality of images for determining a focus drift or focus trend.

In some exemplary embodiments, the imaging reader 106 is implemented in a handheld bar code scanner device. When the handheld scanner is placed within a stationary cradle thereby establishing an upright scanning position, the handheld scanner may automatically sense that placement and enter the hands-free mode.

In embodiments, the imaging sensor 112 may be a charge coupled device, or another solid-state imaging device. The imaging sensor 112 may be a one megapixel sensor with pixels of approximately three microns in size. In embodiments, the imaging sensor 112 includes a sensor having an active area of 3 millimeters, 4.5 millimeters, 5 millimeters, 6.8 millimeters, 7.13 millimeters, less than 5 millimeters, less than 10 millimeters, or less than 50 millimeters. The imaging sensor 112 may have a total of about 1 megapixels, 2 megapixels, 2.3 megapixels, 5 megapixels, 5.1 megapixels or more than 5 megapixels. Further, the imaging sensor 112 may include sensors with pixels having dimensions of less than 10 microns, less than 5 microns, less than 3 microns, or less than 2 microns in size in at least one dimension of the pixel. In embodiments, the lens assembly is configured to capture images with a modulation transfer function of 40% at 160 line pairs per millimeter.

Figure 3:
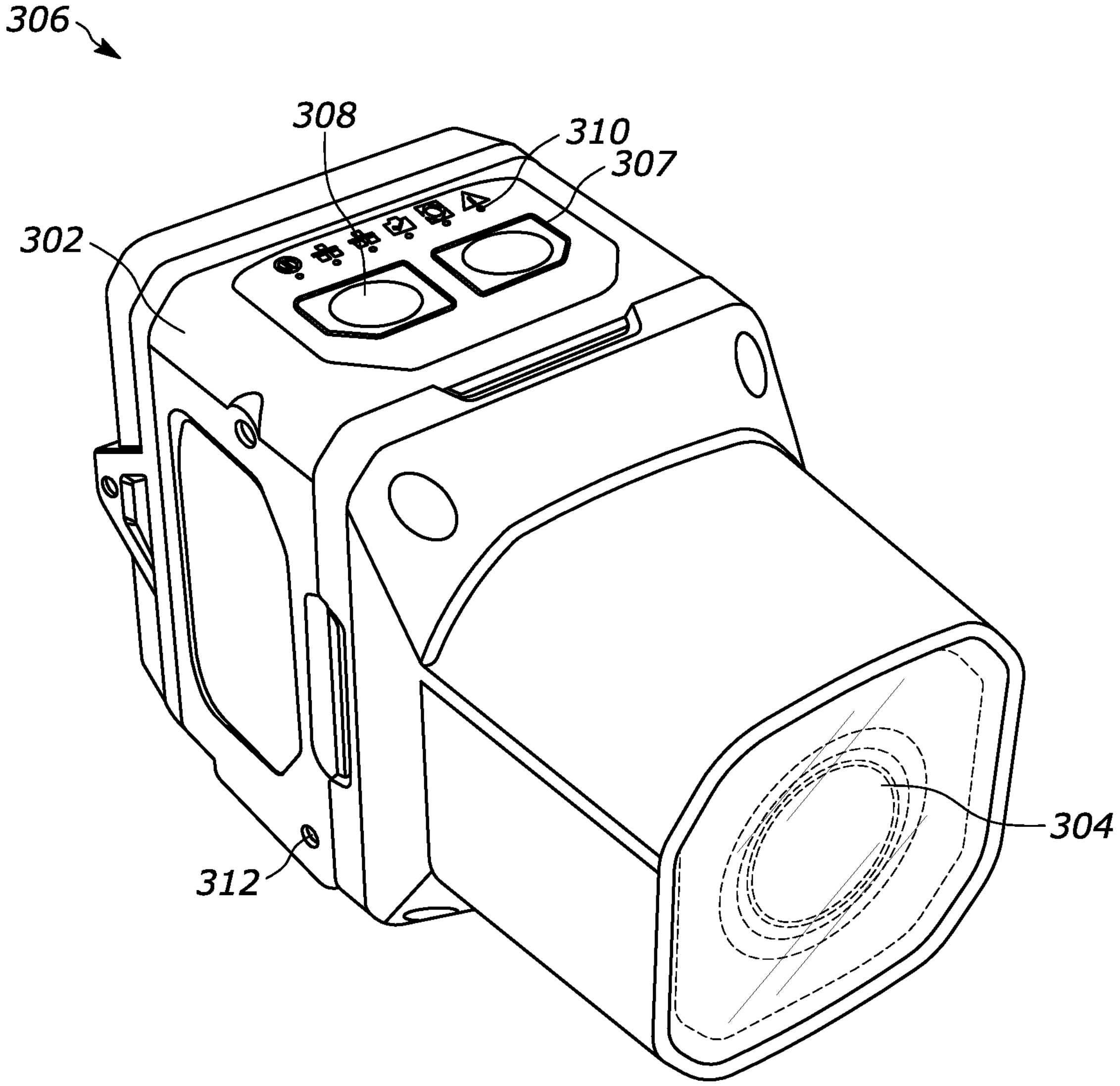
FIG. 3 is a perspective view of an example machine vision device for performing the disclosed methods, in accordance with embodiments described herein.

FIG. 3 is a perspective view of an example machine vision device 306 that may be implemented as the imaging reader 106 of FIGS. 1 and 2, in accordance with embodiments described herein. The machine vision device 306 includes a housing 302, an imaging aperture 304, a user interface label 307, a dome switch/button 308, one or more light emitting diodes (LEDs) 310, and mounting point(s) 312. In examples, the machine vision device 306 may include or otherwise be adaptable to include, for example but without limitation, one or more bandpass filters, one or more polarizers, one or more waveplates, one or more DPM diffusers, one or more C-mount lenses, and/or one or more C-mount liquid lenses over or otherwise influencing the focal distance of the machine vision device 306.

Figure 5:
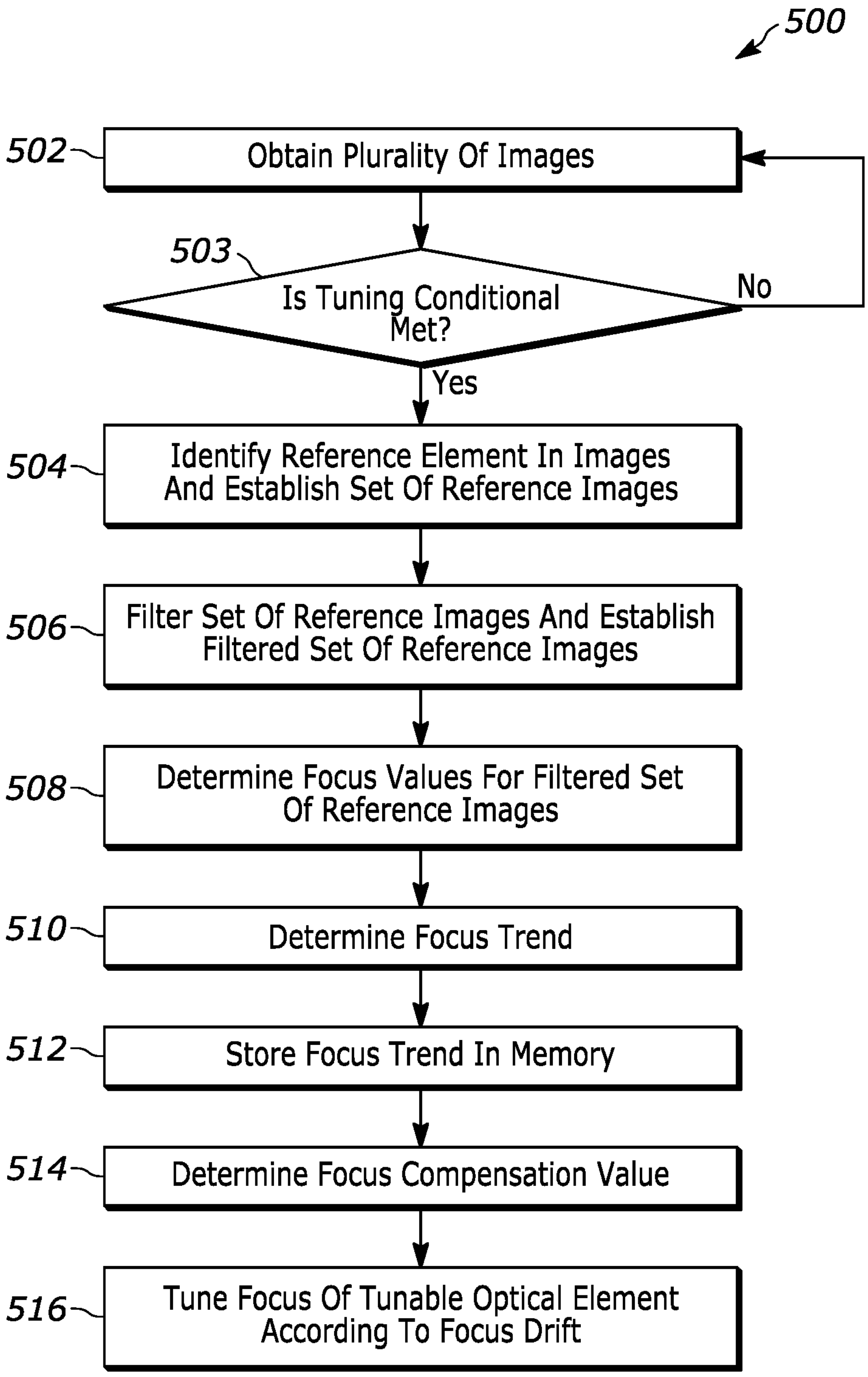
FIG. 5 is a flowchart representative of a method for performing focus tuning of an imaging system, in accordance with embodiments described herein.

As further described in reference to the method 500 of FIG. 5, the machine vision device 306 may be controlled to perform focus tuning initiated by a user, or based on a condition such as being performed periodically after a number of machine vision operations, scans, or time. The machine vision device 306 may access machine-executable instructions and retrieve a job file to perform the focus tuning operations described herein. For example, a job file may include instructions for the variable focus imaging controller 214 to control the actuator to fix or lock a focal distance of the variable focus optical element, and further for the image sensor 206 to capture a plurality of images at the fixed focal distance. The job file may further include one or more image metrics for filtering a plurality of images to generate a set of reference images. The job file may further instruct a processor to determine a focus value for each image of the set of reference images, and further to determine a focus drift or trend. The job file may then cause the processor to store data indicative of the focus trend in a memory, such as the memory of the imaging reader 106, or of the server 112, or of another memory. The job file may further cause a processor to determine a focus compensation value from the focus drift, and the job file may cause the variable focus imaging controller 214 to control the actuator 215 to tune the focal distance of the variable focus optical element 208 according to the focus compensation value.

The user interface label 307 may include the dome switch/button 308 and one or more LEDs 310, and may thereby enable a variety of interactive and/or indicative features. Generally, the user interface label 307 may enable a user to trigger and/or tune to the machine vision device 306 (e.g., via the dome switch/button 308) and to recognize when one or more functions, errors, and/or other actions have been performed or taken place with respect to the machine vision device 306 (e.g., via the one or more LEDs 310). For example, the trigger function of a dome switch/button (e.g., dome/switch button 308) may enable a user to capture an image using the machine vision device 306 and/or to display a trigger configuration screen of a user application via a monitor or visual display. The trigger configuration screen may allow the user to configure one or more triggers for the machine vision device 306 that may be stored in memory for use in later developed machine vision jobs, as discussed herein.

The mounting point(s) 312 may enable a user connecting and/or removably affixing the machine vision device 306 to a mounting device (e.g., imaging tripod, camera mount, etc.), a structural surface (e.g., a warehouse wall, a warehouse ceiling, scanning bed or table, structural support beam, etc.), other accessory items, and/or any other suitable connecting devices, structures, or surfaces. For example, the machine vision device 306 may be optimally placed on a mounting device in a distribution center, manufacturing plant, warehouse, and/or other facility to image and thereby monitor the quality/consistency of products, packages, and/or other items as they pass through a field of view of the machine vision device 306. Moreover, the mounting point(s) 312 may enable a user to connect the machine vision device 306 to a myriad of accessory items including, but without limitation, one or more external illumination devices, one or more mounting devices/brackets, and the like.

In addition, the machine vision device 306 may include several hardware components contained within the housing 302 that enable connectivity to a computer network (e.g., network 112 of FIG. 2). For example, the machine vision device 306 may include a networking interface that enables the machine vision device 306 to connect to the network (i.e., the network 112 of FIG. 2), such as a Gigabit Ethernet connection and/or a Dual Gigabit Ethernet connection. Further, the machine vision device 306 may include transceivers and/or other communication components as part of the networking interface to communicate with other devices via, for example, Ethernet/IP, PROFINET, Modbus TCP, CC-Link, USB 3.0, RS-232, and/or any other suitable communication protocol or combinations thereof.

Figure 4:
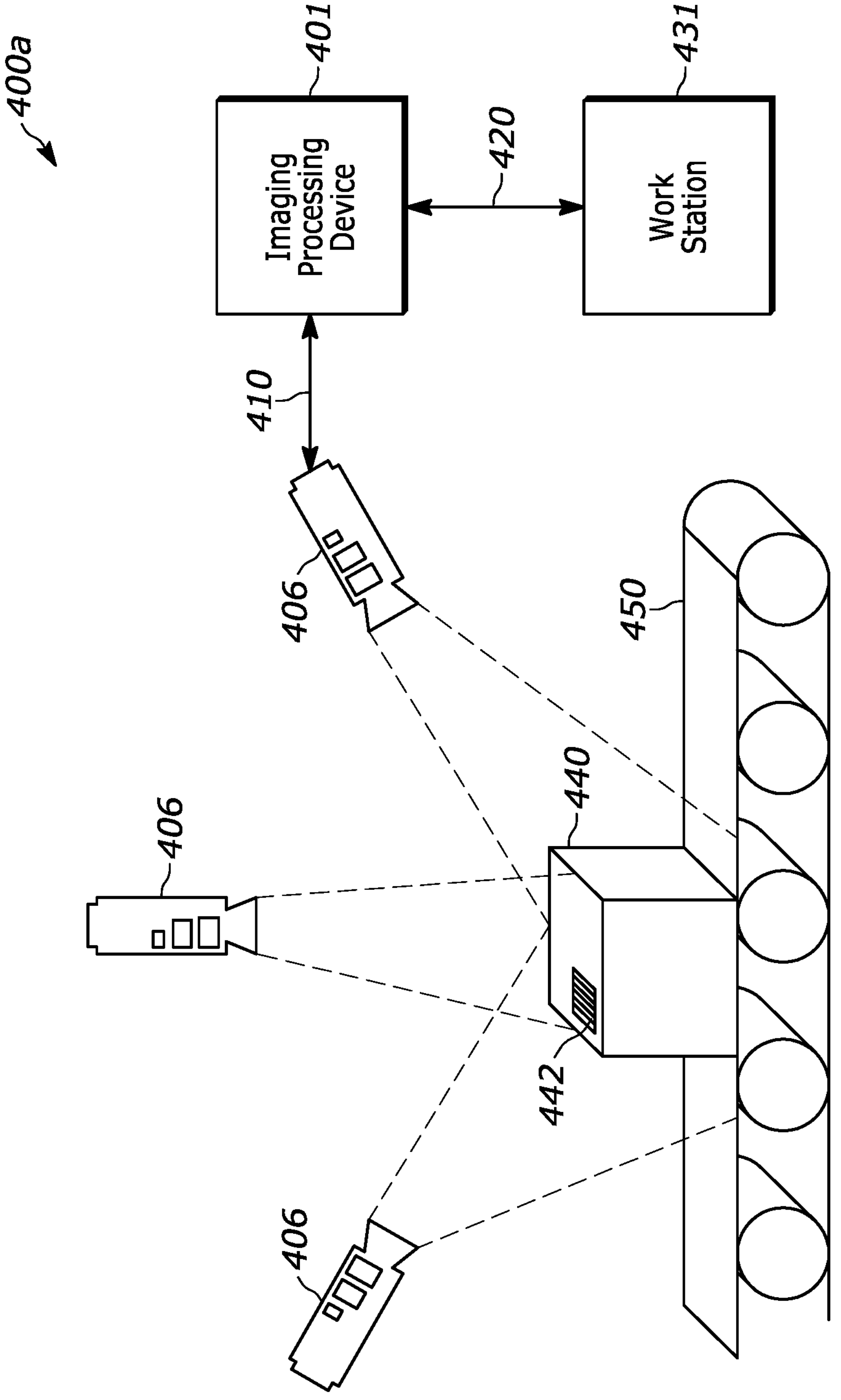
FIG. 4 illustrates an example environment for implementing the methods and systems described herein.

FIG. 4 illustrates an example environment 400, respectfully, for the implementation of the methods and systems described herein. The example environment 400 may include one or more imaging devices 411 (e.g., the imaging reader 106 of FIGS. 1 and 2, or machine vision device 306 of FIG. 3), a work station 431, an imaging processing device 401, an object 240, and/or a conveyor assembly 250. In examples, image processing performed by the image processing device 401 may be performed by the imaging devices 411, as described with reference to the imaging readers 106 and 306 of respective FIGS. 2 and 3. In other embodiments, the image processing may be performed external to the imaging devices 411, as shown in FIG. 4.

In operation, an object 440 may be moved across the conveyor assembly 450. The one or more imaging devices 406 may capture image data of the object 440 (e.g., via the one or more image sensors 206 of the imaging reader 106) as the object 449 moves past the one or more imaging devices 406 along the conveyor assembly 450.

In some embodiments, the object may trigger a sensor, not shown (e.g., a motion sensor, a proximity sensor, lidar, etc.). In some embodiments, the sensor may directly cause the one or more imaging devices 406 to capture the image data of the object 440. Alternatively, in some embodiments, the sensor may transmit a triggering signal to the imaging processing device 401 which may in turn send a capturing signal to the one or more imaging devices 406. In embodiments where two or more imaging devices 406 are used, the imaging processing device 401 may transmit a capturing signal instructing the two or more imaging devices 406 to capture the image data at about the same point in time. Once the one or more imaging devices 406 have captured the image data, the one or more imaging devices 406 may transmit the image data to the imaging processing device 401.

Alternatively, in some embodiments, the one or more image devices 406 may continuously capture image data. In these embodiments, the one or more image devices 406 may continuously transmit the image data to the imaging processing device 401. Upon receiving the image data, the one or more image devices 406 may select one or more frames from the image data (e.g., by using one or more image processing algorithms or techniques to determine that the object 440 is in a frame of the image data).

In some embodiments, once the imaging processing device 401 receives the image data and/or selects the one or more frames of the image data, the imaging processing device 401 may determine one or more candidate positions of an indicia 442, or a reference element, on the object 440 (e.g., via one or more image processing algorithms and/or techniques). The multiple perspectives may overlap (as illustrated in FIG. 2A) which allow for the imaging processing device 401 to determine a general location across the image data. In the example provided in FIG. 4, the imaging processing device 401 would determine the candidate position of the indicia 442 as being somewhere in the top portion of the object 440. The imaging processing device 401 may then determine a region of interest in images for searching for and identifying the indicia 442 in the captured images. In implementations, the region of interest may be provided by a user, such as via a user interface of the workstation 431, or retrieved from a memory or server. In some embodiments, the imaging processing device 401 may determine one or more candidate positions of a reference element or point of interest of the object 440. The reference element may be an identifying and/or defining structure, feature, and/or other aspect of the object 240 such as a corner, a graphic, an alphanumeric, a barcode, etc.

The image processing device 401 may identify a reference element in at least two images of a plurality of images captured by the imaging devices 406. The image processing device 401, or another processor, may then filter the captured images according to an image metric and generate a filtered set of reference images. For example, the image processing device 401 may filter the images according to a contrast value of the images or of a region of interest in the images. The processing device 401 may determine a set of reference images as images having a contrast value above a certain limit. The processing device may filter the images to generate a set of reference images based on one or more image parameters or image metrics including, but not limited to, an image contrast, brightness, resolution, sharpness, pixels per module value (i.e., module size or the number of pixels covered by the narrowest element of a barcode when measured in an image coordinate system with the barcode being oriented at 0 or 180 degrees), or another image metric or property.

The image processing device may then further determine a focus value from each image of the set of reference images, and further determine a focus drift or focus trend from the focus values. The image processing device 401 may then store the focus trend in a memory, or may further cause a controller to tune or adjust a focus of the one or more imaging devices 406 based on the focus trend.

The work station 431 may be a general computing device (such as a desktop computing device, a laptop computer, a tablet, a mobile device, a smartphone or other smart device, a wearable device, smart contacts, smart glasses, headsets, etc.). In some embodiments, there may be a plurality of imaging processing devices 401, imaging devices 406, capturing and/or processing image data across multiple conveyor assemblies 450 in parallel. In these embodiments, the work station 431 may act as a central hub designated to receive and/or process the plurality of image data, indicia 442, and/or identifying data of object(s) 440.

While FIG. 4 illustrates an implementation wit separate imaging devices 406 and image processing device 401, other implementations are envisioned that utilize a single imaging device 406, with the image processing performed in the single housing of the imaging device 406, as illustrated with respect to the imaging readers 106 and 306 of FIGS. 1 and 3 respectively. FIG. 5 is a flow diagram that illustrates a method 500 of performing focus tuning for an imaging reader. The method 500 may be implemented by the imaging readers 106, 306, and 406 of any of FIGS. 1-4, for example. For clarity and simplicity, the method 500 will be described with combine reference to components of FIGS. 2, and 4. In the illustrated embodiments, the imaging scanner is part of a scanning station of an inventory system, where goods are conveyed by the scanning surface or across the scanning surface to monitor and control delivery of the goods, for example, shipping goods from a facility or receiving shipped goods to a facility, as illustrated in FIGS. 1, and 4. The methods described herein may be implemented in an inspection station where on OOI moves into a field of view of an imaging reader, the OOI pauses momentarily in the field of view to be imaged, and then the OOI moves out of the field of view, or the OOI may proceed through the field of view without stopping.

The imaging reader 106 obtains a plurality of images of a field of view of the imaging reader 106 at block 502. At least one image of the plurality of images includes a reference element disposed in the field of view of the imaging reader 106. In implementations, the plurality of images may include at least two images that include a reference element. The reference element may include one or more of a 1D barcode, 2D barcode, static QR code, dynamic QR code, UPC code, a predefined custom pattern, alphanumeric identifier, a feature having a spatial frequency content of greater than of greater than a 2 mil barcode or 2 pixels per module, or an element with a plurality of different sized features at different focuses of the imaging system. The reference element may be a predetermined part of an object such as a surface, corner, or other feature on an object or target in the field of view of the imaging reader 106. In some examples, the reference element may include text, one or more electrical traces on a circuit board, one or more electrical components (e.g., resistors, chips, transistors, etc.), grids on a surface, a pattern on a surface, predefined fiducial markers, or an outline of an object of interest in the field of view of the imaging reader 106. In examples, the reference element may be disposed in a fixed position relative to the imaging reader 106, such that the reference element is always visible to the imaging reader 106, or such that the reference element is visible to the imaging reader when not obstructed by an object in the field of view of the imaging reader 106. In other examples, the reference element may be selectively removable from the field of view of the imaging reader 106. For example, an object having the reference element may be placed in the field of view of the imaging reader to perform the focus tuning described herein, and the reference element may then be removed from the field of view to perform scans and machine vision operations on objects.

At block 503, the processor determines if a tuning condition for performing focus tuning of the system has been met. The condition may be any monitorable or quantifiable conditional metric. For example, the condition for performing focus tuning may be periodic based on a number of operations or time (e.g., every 100 scans, every 50 executions of a machine vision operation, every 2 hours, every 500 images obtained, etc.). In implementations the condition may be based on an operational status of an imaging reader such as the condition may be such that focus tuning is performed every time the imaging reader is powered up, enters a calibration mode, a lens temperature fluctuation, environmental temperature fluctuation, aging of a lens, etc. If the focus tuning condition has not been met, than the system continues to obtain images.

If it is determined that the focus tuning conditional has been met, one or more processors identify the reference element in at least two of the images of the plurality of images at block 504. The processor then determines a set of reference images as the images identified as including the reference element. To identify the reference element, the processor may perform image processing on the images of the plurality of images. The image processing may include applying a spatial lowpass filter, spatial highpass filter, Fourier lowpass or highpass filter, performing a noise reduction, a scaling, rotation, shearing, reflection, or another image filtering or image processing technique. In implementations, to identify the reference element in at least two of the images of the plurality of images, a processor may provide one or more images of the plurality images to a user via a user interface such as via a display, touch screen, or workstation. The user may then select a region of interest in one or more images of the plurality of images via an input device such as a keyboard, mouse, touchscreen, etc. The region of interest may be selected as a region containing a barcode, a QR code, an alphanumeric, a pattern, a feature of an image or of an object captured in the image, or of another element to be used as a reference element. One or more processors then identify the reference element in the region of interest of the one or more images.

The one or more processors then determine an image metric value for one or more images of the set of reference images, and further filter the set of reference images based on the determined image metric values at block 506. In examples, the processors may determine one or more image metric values for each of the images of the set of reference images. The image metric may include a property or characteristic of the images such as a sharpness value, a contrast value, a normalized sharpness, an image resolution, a spatial frequency content value, a noise measurement value, a dynamic range value, a measurement of image distortion, a blur value, a pixels per module value, a modulation transfer function, or another value associated with an image or image quality. The processor may filter the set of reference images based on one or more of the image properties or characteristics. For example, the set of reference images may be filtered into a set of filtered images that have an image sharpness value greater than a given threshold, or with a PPM value within a certain range of values. In examples, the processor may use a combination or weighted combination of image properties, image characteristics, or image metric values for filtering the set of reference image. The one or more processors then establish a filtered set of reference images from the set of reference images based on the given image metric. Filtering the set of reference images may reduce the overall noise of determined focus values which may cause errors or result in inaccurate focus drift trends.

The one or more processors then identify a focus value for each image if the filtered set of reference images at block 508. The identified focus values are indicative of a focal distance of the imaging reader 106 at the respective times that each image of the filtered set of reference images was taken. To identify the focus values, the processor may perform image processing to determine the focus value from or more image metrics. In examples, the processor may extract a focus value from image meta-data including a focus value in diopters or from a lens voltage level.

After the focus values have been identified, the one or more processors then determine a focus drift or focus trend from the plurality of focus values at block 510. The focus trend is indicative of a change in focal distance of the imaging reader 106 over time. The focus trend drifting of the focal distance may be due to one or more optical elements including filters, fixed lenses, variable focus lenses, temperature changes, humidity, etc. The focus trend may be determined by a regression model such as a linear model, a spline, etc. Further, the focus trend may be taken as an average value, such as a rolling average, of the focus values over time or over a number of images of the filtered set of reference images.

At block 512, the one or more processors then stores data indicative of the focus trend in a memory. The data indicative of the focus trend may include the focus values for the respective images of the filtered set of reference images, the focus trend data points (e.g., values indicative of the regressive model or a trend line), a focal length in millimeters or inches, a lens diopter value, or a lens voltage level.

The method 500 may further include determining, by the one or more processors, a focus compensation value from the focus trend, or from the plurality of focus values, at block 514. The focus compensation value may be determined as an amount of tuning that may be applied to a variable focus optical element, such as a liquid lens, to set the focal distance of the imaging reader to a desired focal distance. For example, a processor may determine that the focus trend indicates that the focus has drifted beyond an acceptable range, or beyond a focal distance threshold value, for performing efficient machine vision processes. For example, a focus drift threshold may include one or more diopter values, a percentage of focus drift from a desired focus value, or a focal length in millimeters or inches. In any embodiments, a focus drift may be evaluated as a focus score that is indicative of the drift of the focus of an imaging reader or machine vision system. One or more processors may then determine an amount to tune the variable focus optical element to bring the focal distance of the imaging reader 106 back into an acceptable range for performing scanning or machine vision processes. In examples, the method may include providing a user with an indication that the focus has drifted beyond a focal distance threshold value. The user may then determine whether to tune the focal distance of a variable optical element or not. The user may provide manual input to control the tuning of the focal distance, or the user may provide input that causes the system to tune the focal distance based on the determined focus drift of the imaging reader.

A controller may then control the focal length of a tunable optical element of the imaging reader 106 according to the determined focus compensation value at block 516. For example, the controller may apply a voltage to a liquid lens to tune the focal length of the lens to adjust the focal distance of the imaging reader 106 into a desired focal distance range. In any examples, the tunable optical element may include one or more liquid lenses, electrically tunable lenses, mechanically translatable lenses, or another element that a controller may interact with, electrically or mechanically, to control the focal distance of the imaging reader 106.

Figure 6:
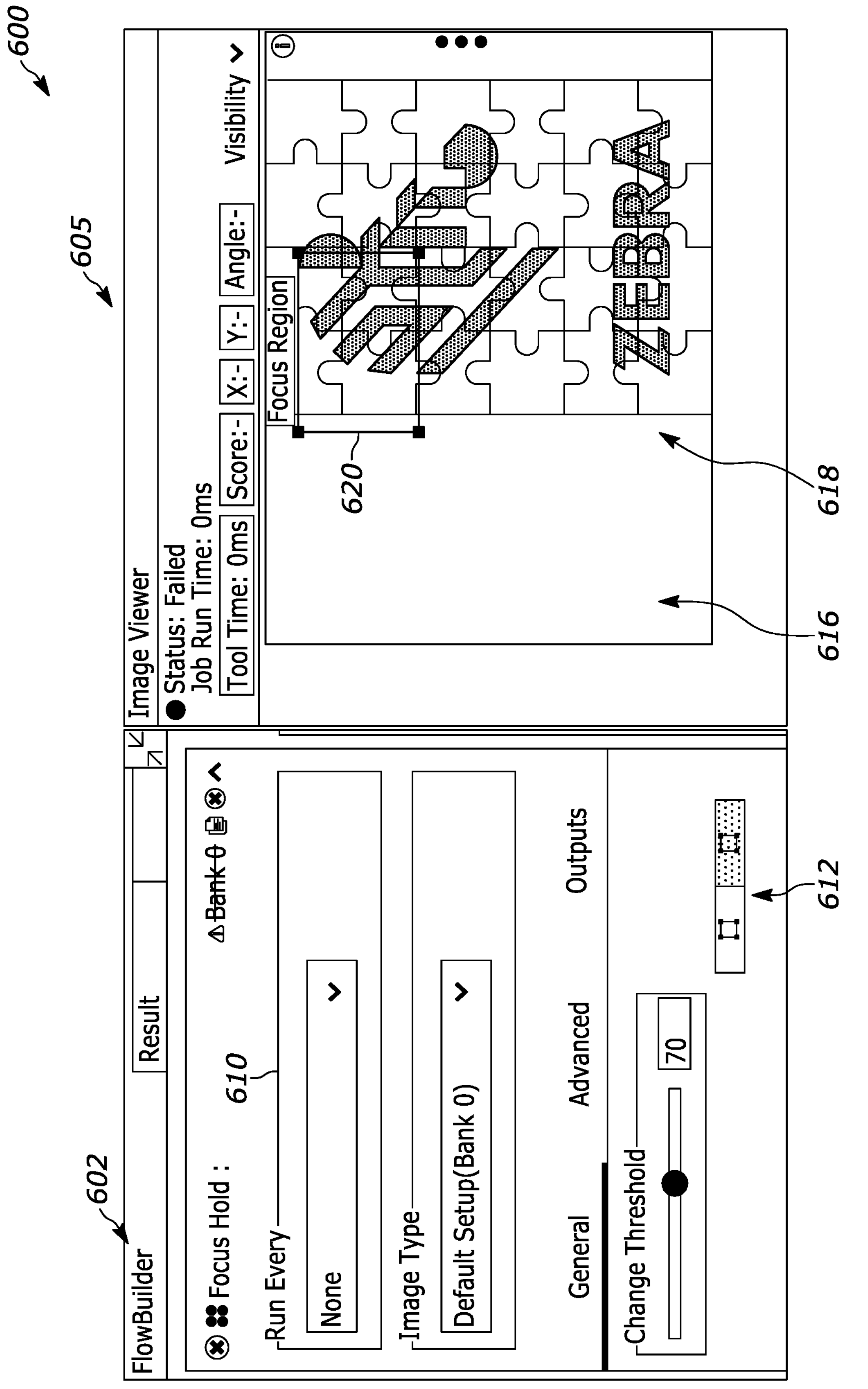
FIG. 6 is a representation of an example user interface for performing the methods described herein.

FIG. 6 provides a representation of an example user interface 600 for performing the methods described herein. The user interface 600 includes a job window 602 and an image window 605. The job window allows a user to provide inputs for settings for performing imaging and focus tuning according to the methods described herein. Further, the job window 602 allows a user to initiate a focus tuning operation. The image window 605 provides a user with one or more images 616 captured by an imaging sensor of an imaging reader of a scanner or machine vision system.

In the example user interface 600, a user may provide a desired frequency for performing focus tuning via a frequency drop down menu 610, which causes the imaging reader to perform the focus tuning operation based on an input metric. For example, the drop down menu may allow a user to select to run the focus tuning operation periodically based on a number of scans or runs of a machine vision operation, based on a passage of time, run on boot up, run on job change, run on the stopping of a run of a same job or a re-deploy of a job, or run on device IP address change. The job window 602 further may allow a user to force the system to perform focus tuning at any given time. The illustrated job window 602 further provides region of interest (ROI) selection tools 612. The ROI selection tools 612 may allow a user to draw a ROI in an image presented in the image window 605. In the illustrated example, a user has drawn a rectangle to indicate a ROI 620 in the image 616. The image 616 includes a target object 618 being a jigsaw puzzle with text and a symbol. The user has selected the ROI 620 include a portion of the symbol that may be used as the reference element for performing focus tuning as described herein. The system may then look for the reference element in other images, or look in a same region of interest for the reference element.

Figure 7:
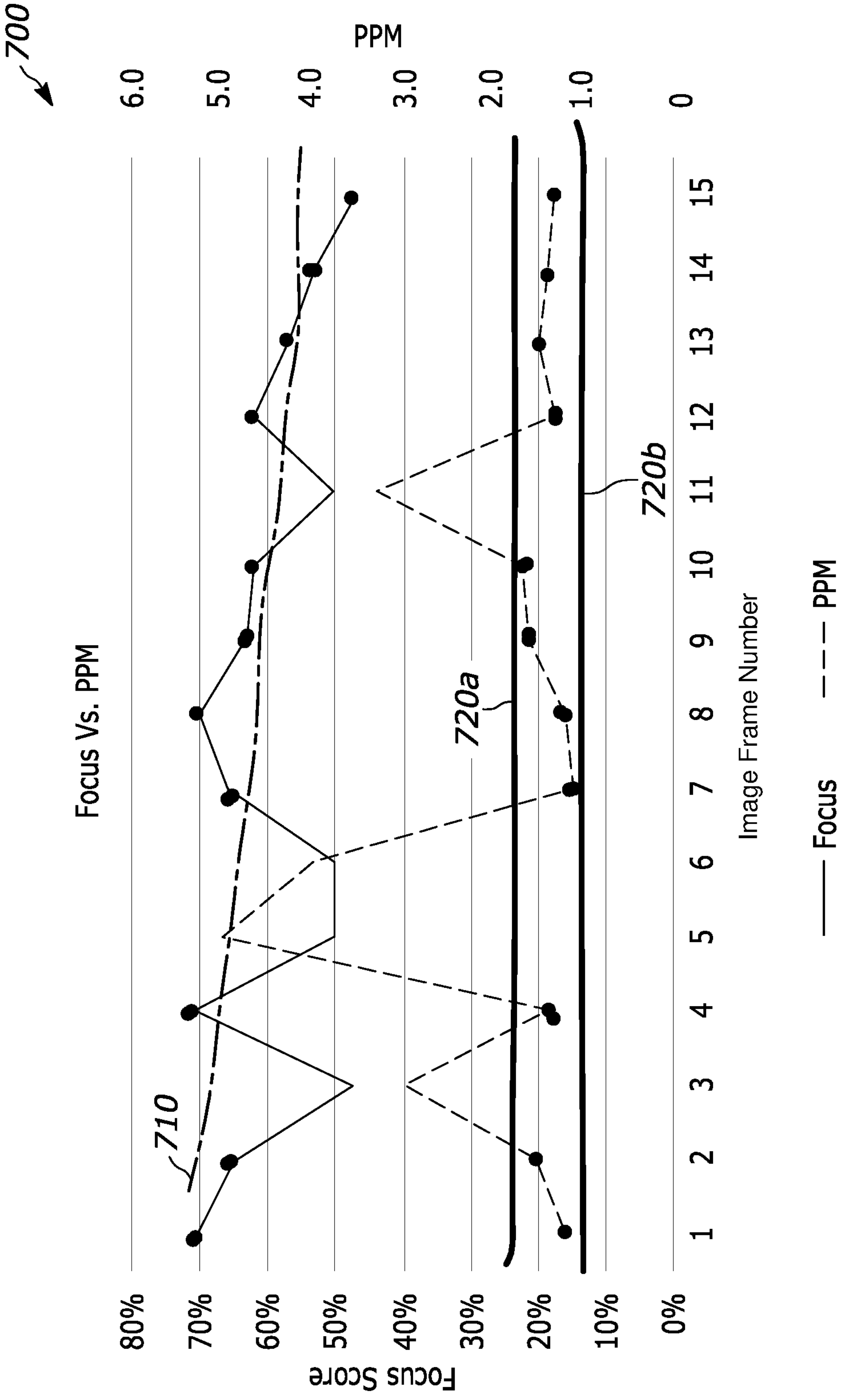
FIG. 7 is a plot of a focus score and pixels per module value for a set of reference images obtained by an imaging reader as determined by the methods and systems of this disclosure.

FIG. 7 is a plot 700 of a focus score and PPM values for a set of reference images obtained by an imaging reader as determined by the methods and systems of this disclosure. The focus score indicates the percentage of drift of the focus away from the set focus value for the imaging reader. The focus score may be one or more of the image metrics described herein, or may be determined from an image metric. For the illustrated focus tuning operation, a range of PPM values was used as the image metric for filtering the set of reference images and generating the filtered set of reference images. The plot 700 shows an upper PPM limit 720*a* and a lower PPM limit 720*b* for filtering the set of reference images. The system generated the filtered set of reference images as only including the images with a PPM value between the upper and lower PPM limits 720*a* and 720*b*. The filtered set of images are represented by the markers along each of the focus score, and PPM data curves. Focus values with PPM values outside of the upper and lower PPM limits 720*a* and 720*b* are not considered in determining the focus drift. After the system determined the filtered set of reference images from the PPM ranges of the images, only the focus values corresponding to the filtered set of reference images were used for determining the focus drift. A processor then calculates a focus trendline 710 from the focus values, or focus score, of the filtered set of reference images. The focus trendline 710 shows a drift of the focus from about 70% to nearly 55% of the desired focus value. A processor may then provide the focus trendline 710, or other information indicative of the focus drift to a user. The user may then provide manual control of a variable optical element to tune the focus of the imaging reader. Further, a processor may further control a controller to tune the focal distance of a variable optical element based on the focus trendline, or other information indicative of the focus drift of the imaging reader.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The invention claimed is:

1. A method for performing focus tuning of an imaging system, the method comprising:

obtaining, by an imaging sensor within the imaging system, a plurality of images of a field of view of the imaging sensor;

identifying, by a processor within the imaging system, a reference element in at least two of the images of the plurality of images thereby establishing a set of reference images;

filtering, by the processor within the imaging system, the set of reference images based on an image metric and establishing a filtered set of reference images;

identifying, by the processor and from the set of filtered reference images, a plurality of focus values of the imaging system, each focus value corresponding to a respective reference image of the filtered set of reference images;

determining, by the processor, a focus trend from the plurality of focus values;

determining, by the processor, a focus compensation value from the plurality of focus values or the focus trend, and tuning, by a controller configured to control a focal length of a tunable optical element of the imaging sensor, the focal length of the tunable optical element according to the focus compensation value.

2. The method of claim 1, further comprising storing, in a memory, data indicative of the focus trend.

3. The method of claim 1, wherein the tunable optical element comprises a liquid lens.

4. The method of claim 1, wherein the tunable optical element comprises an electrically tunable lens.

5. The method of claim 1, further comprising:

determining, by the processor, that a focal distance of the imaging system has exceeded a focus threshold value; and providing, to a user, an indication that the focal distance has exceeded the threshold value.

6. The method of claim 1, wherein identifying a reference element in at least two of the images of the plurality of images comprises:

providing, via a user interface, one or more images of the plurality of images to a user;

receiving, via the user interface, a selection of a region of interest in one or more images of the plurality of images; and identifying, by the processor, the reference element in the region of interest.

7. The method of claim 1, wherein filtering the set of reference images based on an image metric comprises:

determining, by the processor, an image metric value for each image of the set of reference images; and determining, by the processor, the filtered set of reference images as images of the set of reference images with a respective image metric value within an image metric threshold.

8. The method of claim 7, wherein the image metric value comprises at least one of a sharpness value, a contrast value, a normalized sharpness value, a resolution, a pixels per module value, a modulation transfer function, and a spatial frequency content value.

9. The method of claim 1, further comprising:

receiving, via a user interface, from a user an input indicative of a condition for performing focus tuning; and initiating identifying, by the processor, the reference element in at least two of the images of the plurality of images based on the received condition.

10. The method of claim 9, wherein the condition includes at least one of a temporal frequency of performing focus tuning, a number of scanning operations, a lens temperature fluctuation, environmental temperature fluctuation, or aging of a lens.

11. The method of claim 1, wherein the reference element comprises at least one of a 1D barcode, 2D barcode, static QR code, dynamic QR code, UPC code, a predefined custom pattern, alphanumeric identifier, a feature having a spatial frequency content of greater than of greater than a 2 mil barcode or 2 pixels per module, or an element with a plurality of different sized features at different focuses of the imaging system.

12. The method of claim 1, wherein the reference element comprises at least one of text, electrical traces on a circuit board, one or more electrical components, grids on a surface, a pattern on a surface, predefined fiducial marks, or an outline of an object of interest.

13. The method of claim 1, wherein the reference element is selectively removable from the imaging system.

14. A focus tuning imaging system comprising:

a tunable optical element;

a controller in communication with the tunable optical element, the controller configured to control a focus of the tunable optical element;

an imaging sensor configured to capture images of a field of view of the imaging sensor; and a processor and computer-readable media storage having machine readable instructions stored thereon that, when the machine readable instructions are executed, cause the imaging system to:

obtain, by the imaging sensor, a plurality of images of a field of view of the imaging sensor;

identify, by the processor, a reference element in at least two of the images of the plurality of images thereby establishing a set of reference images;

filter, by the processor, the set of reference images based on an image metric and establishing a filtered set of reference images;

identify, by the processor and from the set of filtered reference images, a plurality of focus values of the imaging system, each focus value corresponding to a respective reference image of the filtered set of reference images;

determine, by the processor, a focus trend from the plurality of focus values;

determine, by the processor, a focus compensation value from the plurality of focus values or the focus trend; and tune, by the controller configured to control the focal length of a tunable optical element of the imaging sensor, the focal length of the tunable optical element according to the focus compensation value.

15. The system of claim 14, wherein the machine readable instruction further cause the system to store, in a memory, data indicative of the focus trend.

16. The system of claim 14, wherein the tunable optical element comprises a liquid lens or an electrically tunable lens.

17. The system of claim 14, wherein the machine readable instructions further cause the system to:

determine, by the processor, that a focal distance of the imaging system has exceeded a focus threshold value; and provide, to a user, an indication that the focal distance has exceeded the threshold value.

18. The system of claim 14, wherein to identify a reference element in at least two of the images of the plurality of images, the computer readable instructions further cause the system to:

provide, via a user interface, one or more images of the plurality of images to a user;

receive, via the user interface, a selection of a region of interest in one or more images of the plurality of images; and identify, by the processor, the reference element in the region of interest.

19. The system of claim 14, wherein to filter the set of reference images based on an image metric the machine readable instructions further cause the system to:

determine, by the processor, an image metric value for each image of the set of reference images; and determine, by the processor, the filtered set of reference images as images of the set of reference images with a respective image metric value within an image metric threshold.

* * * * *